(12) United States Patent
Neyret et al.

(10) Patent No.: US 11,636,827 B2
(45) Date of Patent: Apr. 25, 2023

(54) METHOD FOR MANAGING THE DISPLAY OF A LEAST ONE INFORMATION ITEM, AND ASSOCIATED COMPUTER PROGRAM PRODUCT, INFORMATION MEDIUM AND DISPLAY SYSTEM

(71) Applicant: Schneider Electric Industries SAS, Rueil Malmaison (FR)

(72) Inventors: Yannick Neyret, Biviers (FR); Romain Gassion, Izeaux (FR); Tewfik Meftah, Grenoble (FR); Thierry Chiche, Saint Ismier (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/539,779

(22) Filed: Dec. 1, 2021

(65) Prior Publication Data

US 2022/0189432 A1 Jun. 16, 2022

(30) Foreign Application Priority Data

Dec. 16, 2020 (FR) ...................................... 2013371

(51) Int. Cl.
*G09G 5/00* (2006.01)
*G09G 3/00* (2006.01)

(52) U.S. Cl.
CPC ............. *G09G 5/006* (2013.01); *G09G 3/001* (2013.01); *G09G 2360/04* (2013.01)

(58) Field of Classification Search
CPC ...................... G06T 19/006; G06T 7/74; G06T 2207/30108; G06T 2207/30244; G06V 20/20; G06V 30/142; G09G 5/006; G09G 3/001; G09G 2360/04

See application file for complete search history.

(56) References Cited

U.S. PATENT DOCUMENTS

| 10,915,754 B2* | 2/2021 | Bare ..................... H04W 4/025 |
| 11,263,818 B2* | 3/2022 | Shreve ................. G06T 19/006 |
| 2012/0210255 A1* | 8/2012 | Ooi ....................... G06T 19/006 715/762 |

(Continued)

OTHER PUBLICATIONS

Rambach, Jason et al., "6DoF Object Tracking based on 3D Scans for Augmented Reality Remote Live Support", Computers, vol. 7, No. 1, Jan. 2, 2018, 22 pages.

(Continued)

*Primary Examiner* — Bryan Earles
(74) *Attorney, Agent, or Firm* — Locke Lord LLP (57) ABSTRACT

A method for managing a display of at least one information item relating to a device disposed in a location, including:
supplying, to the data processing unit, at least one first image of the device,
generating, by the data processing unit, in a memory, a representation of the location including at least one template of the device, the template being composed of a parallelepiped or of a plurality of parallelepipeds,
superimposing the first image on a face to form a representation,
positioning, on the representation, a point of interest including an information item to be displayed relating to the device,
generating an enriched image from the representation, and
a step of display of displaying the enriched image on a screen.

9 Claims, 7 Drawing Sheets

(56) References Cited

U.S. PATENT DOCUMENTS

| | | | | |
|---|---|---|---|---|
| 2015/0077435 A1* | 3/2015 | Koga | ............... | G06F 3/017 |
| | | | | 345/633 |
| 2016/0307367 A1* | 10/2016 | Chuang | ............... | G06T 7/40 |
| 2018/0218538 A1* | 8/2018 | Short | ............... | G06T 7/73 |
| 2020/0051337 A1* | 2/2020 | Reynolds | ............ | H04N 13/128 |
| 2020/0117336 A1* | 4/2020 | Mani | ............ | G06F 8/60 |
| 2020/0379627 A1* | 12/2020 | Reynolds | ............ | G06F 3/04815 |
| 2021/0019947 A1* | 1/2021 | Greunke | ............ | G06T 17/00 |

OTHER PUBLICATIONS

Wither, Jason et al., "Annotation in outdoor augmented reality", Computers and Graphics, vol. 33, No. 6, Dec. 1, 2009, pp. 679-689.
Corbett-Davies, Sam et al., "Physically interactive tabletop augmented reality using the Kinect", Image and Vision Computing New Zeland ACM, Nov. 26, 2012, pp. 210-215.
French Search Report and Written Opinion dated Aug. 25, 2021 for corresponding French Patent Application No. 2013371, 8 pages.

\* cited by examiner

METHOD FOR MANAGING THE DISPLAY OF A LEAST ONE INFORMATION ITEM, AND ASSOCIATED COMPUTER PROGRAM PRODUCT, INFORMATION MEDIUM AND DISPLAY SYSTEM

TECHNICAL FIELD

The present invention relates to a method for managing the display of at least one information item. The present invention also relates to an associated computer program product, information medium and display system.

BACKGROUND

In many industrial fields, superimposing a virtual model on an image, or a plurality of images forming a video, of an industrial device is known, with said virtual model containing information relating to the equipment of this device in order to form a new image, on which the information relating to the equipment is shown on the image of the device.

Such an image is called enriched image, and such a display method is called "augmented reality". The information items are, for example, comments relating to the functions of various components or units of the device, or even indications of links between these components, for example, a representation of an electrical circuit linking two components each appearing on the front face of the device.

Thus, it is possible to generate a representation of a location containing one or more devices and allowing an operator working in this location to easily obtain information relating to the various devices, in order to facilitate this work, even for an operator unfamiliar with the various devices.

These models are generally designed on the basis of the drawings of the devices in order to be very precise and to allow optimized positioning of the various points of interest, i.e. points of the device associated with the displayed information. However, generating these models is time-consuming and complex, with said models representing a significant amount of data, which is difficult to transmit between various devices and to manipulate for each of these devices.

In some cases, it is also known for a representation of the location containing the various devices to be generated directly, without generating a representation of each device, but simply by positioning a photograph of each device in the space and by arranging the various points of interest on these photographs. However, precisely positioning various photographs is difficult without reference points. Consequently, if changes occur on one of the devices, it is difficult to express them in the model since the photograph needs to be repositioned in the space.

Therefore, a requirement exists for a method for displaying an information item that allows a model to be simply generated allowing precise positioning of the added information, whilst ensuring that the model thus generated is simple to process.

SUMMARY

To this end, a method is proposed for managing the display, on a screen of an electronic system, of at least one information item relating to a device disposed in a location, the method comprising:

a first step of supplying a data processing unit with at least one first image of the device;

a first step of generating, by the data processing unit in a memory of the system, a representation of the location comprising at least one template of the device, the template being made up of a parallelepiped or of a plurality of parallelepipeds, each parallelepiped having six faces;

a step of superimposing the first image on a face of the template in order to form a representation of the device;

a first step of positioning, on the representation of the device, at least one point of interest, each point of interest comprising at least one information item to be displayed relating to the device;

a second step of generating, by a controller, an enriched image on the basis of the representation of the device; and a step of displaying the enriched image on the screen of the electronic system.

According to advantageous but non-binding embodiments, the method comprises one or more of the following features, taken individually or according to any technically possible combinations:

the first superimposition step comprises rectification of the first image;

the method further comprises:
  a step of modifying the device, after the first positioning step;
  a second step of supplying a third image of the modified device;
  a step of replacing, in the representation of the device, the first image with the third image; and
  a second step of positioning, on the representation of the device, at least one point of interest comprising at least one information item to be displayed relating to the modified device;

the first positioning step comprises positioning at least one point of interest on the first image superimposed on a face of the template;

the first superimposed image is completely or partially transparent during the step of displaying the enriched image;

the first supply step comprises supplying a plurality of first images of the device, the template comprising a plurality of parallelepipeds in contact with each other, the first superimposition step comprising superimposing a first respective image on each one of at least two faces of said parallelepipeds. A computer program product is also proposed containing software instructions configured to implement a method as previously described when the instructions are executed on a processor.

An information medium is also proposed that stores software instructions configured to implement a method as previously described when the instructions are executed on a processor.

A system is also proposed for displaying information comprising an information processing unit, a memory, at least one imager, the information processing unit being configured to:

receive at least one first image of the device from the at least one imager;

generate, in the memory, a representation of the location comprising at least one template of the equipment, the template being made up of a parallelepiped or of a plurality of parallelepipeds, each parallelepiped having six faces;

superimpose the first image on a face of the template in order to form a representation of the device;

position, on the representation of the device, at least one point of interest, each point of interest comprising at least one information item to be displayed relating to the device; and transmit the representation to a display device.

According to an advantageous but non-binding embodiment, the display system further comprises a display device comprising a display screen and a controller, wherein the information processing unit is configured to transmit the representation to the display device, the controller being configured to:
generate an enriched image on the basis of the representation of the device; and
command the enriched image to be displayed on the screen.

BRIEF DESCRIPTION OF THE DRAWINGS

Features and advantages of the invention will become apparent from reading the following description, which is provided solely by way of a non-limiting example and with reference to the accompanying drawings, in which.

DETAILED DESCRIPTION

Figure 1:
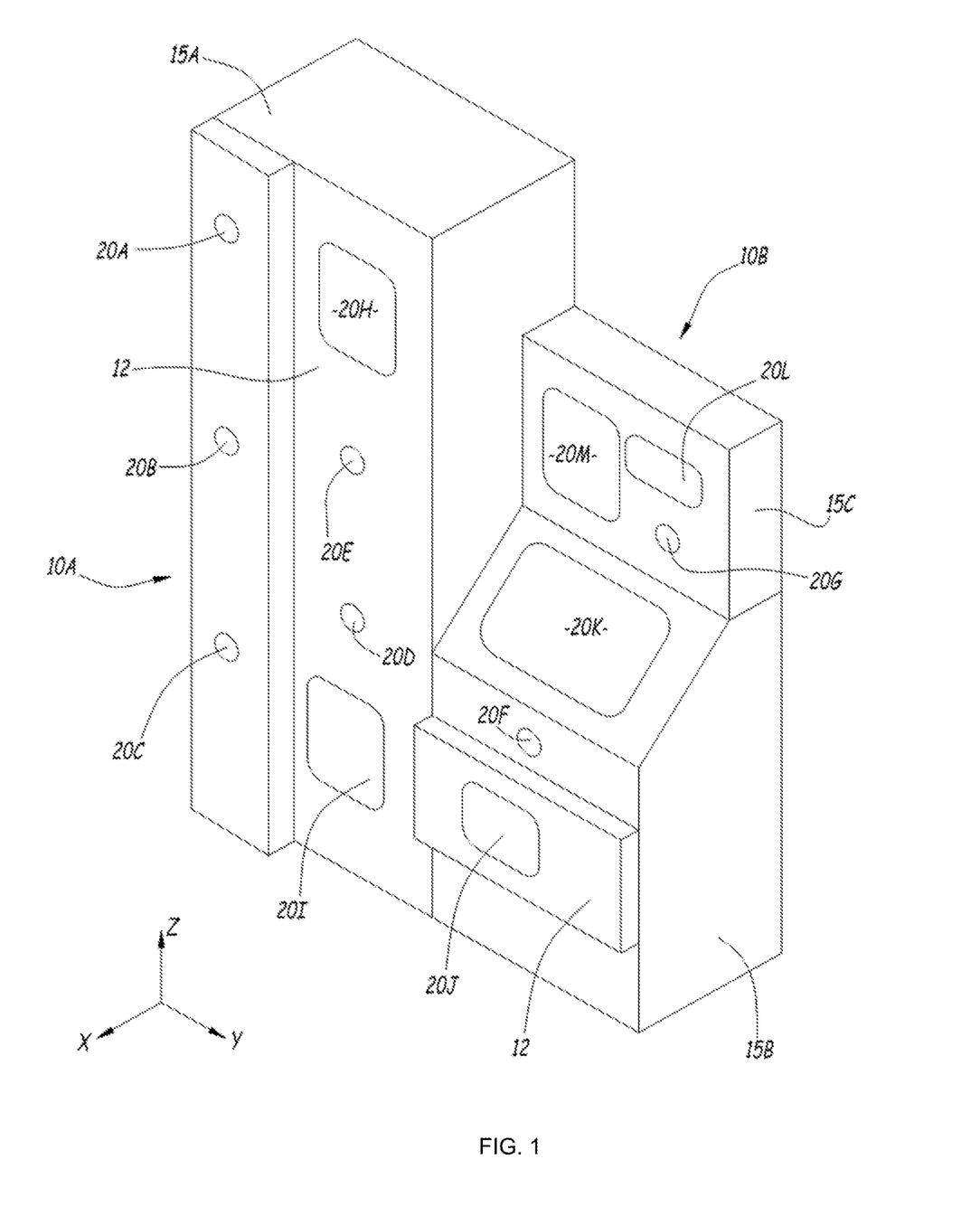
FIG. 1 is a perspective view of two devices.

Two devices 10A, 10B are shown in FIG. 1.

Each device 10A, 10B is an electrical or electronic device, for example.

In particular, at least one device 10A, 10B is an industrial device, for example, a medium voltage electrical panel, a medium voltage protection cell, a low voltage electrical distribution panel or even a system for switching from one low voltage electricity source to another.

Each device 10A, 10B has a plurality of faces 10.

Each device 10A, 10B is disposed in a location containing, for example, at least one other device 10A, 10B.

Three directions X, Y and Z are defined, perpendicular to each other, for the location containing the devices 10A and 10B. The direction Z is a vertical direction of the location.

Each device 10A, 10B comprises, for example, a casing 15A, 15B, 15C or a plurality of casings 15A, 15B, 15C, a set of visible units 20A to 20M each disposed on an outer face of the one or more casings 15A, 15B, 15C and a set of units disposed inside the one or more casings 15A, 15B, 15C.

Each casing 15A, 15B, 15C is configured to isolate the one or more units disposed in the casing 15A, 15B, 15C from the outside.

In the example shown in FIG. 1, the device 10A comprises a single casing 15A, and the device 10B comprises two superimposed casings 15B and 15C; however, the number and the arrangement thereof are likely to vary.

Each visible unit 20A to 20M is supported by a face 12 of the device 10A, 10B, so that they can be accessed by an operator from outside the considered device 10A, 10B.

Hereafter, each visible unit 20A to 20M will be considered to be supported by a face 12 defining the device 10A in the direction X. For example, each face 12 is perpendicular to the direction X, with the exception of a face of the casing 15C supporting the unit 20K, a normal direction of which is included in a plane containing the directions X and Z.

It should be noted that, according to alternative embodiments that can be contemplated, faces defining the devices 10A, 10B in the directions Y or Z are also likely to support one or more units 20A to 20M.

Each unit 20A to 20G is, for example, a connector configured to connect a device to the device 10A, 10B, a unit for activating the device 10A, 10B, such as a handle for opening a door or a hatch of the device 10A, 10B, or even a unit for controlling the device 10A, 10B.

Each unit 20H to 20M is, for example, an indicator or display unit configured to transmit an information item from the device 10A, 10B to an operator.

It should be noted that the units 20A to 20M can be of various types and can differ from the examples provided herein.

Figure 2:
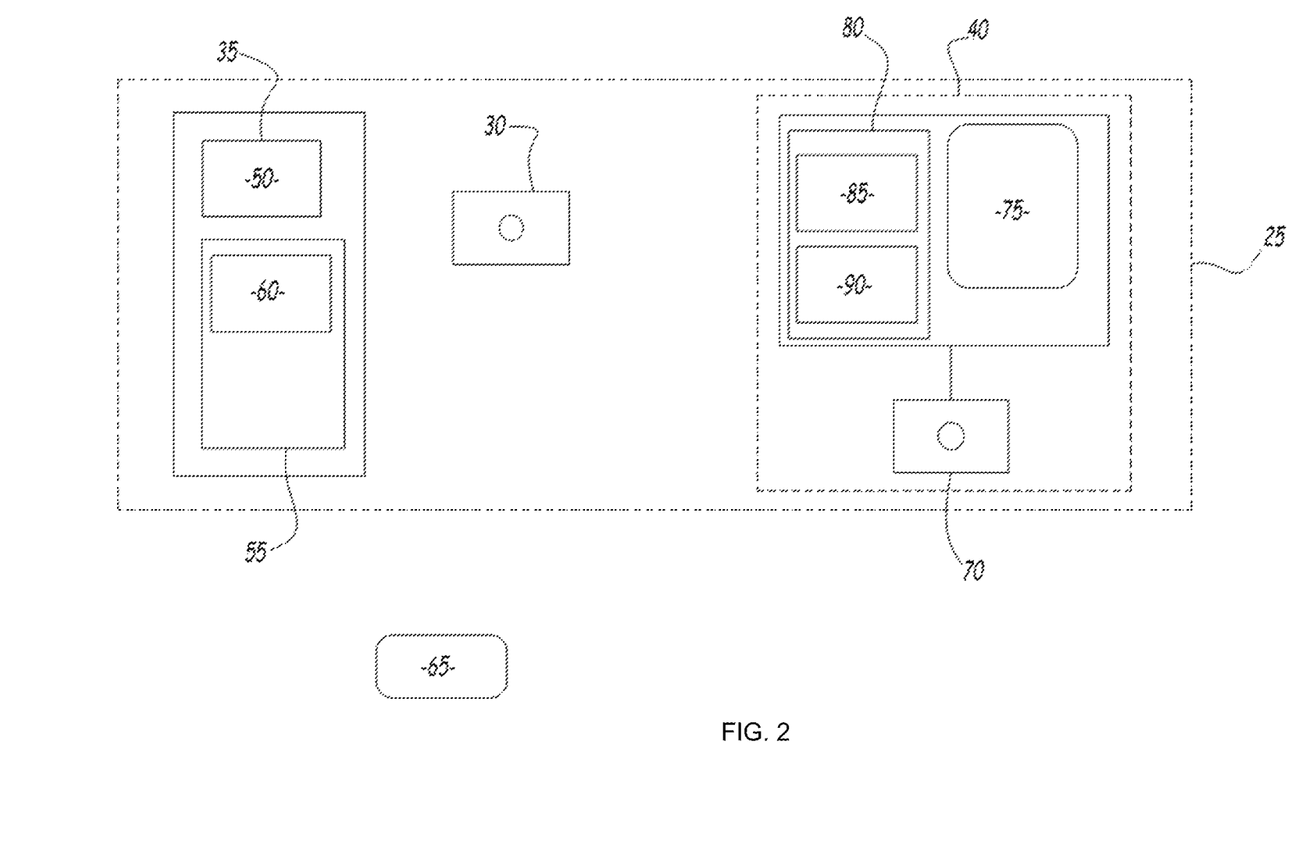
FIG. 2 is a schematic view of a system for managing the display of at least one information item according to the invention.

FIG. 2 shows an example of a system 25 for managing the display of at least one information item relating to each device 10A, 10B.

The system 25 comprises a first imager 30, a first controller 35 and a display device 40.

It should be noted that, even though FIG. 2 shows these three devices 30, 35 and 40 as being separate devices, it is possible to contemplate that a single device can fulfil the role of two or three elements from among the first imager 30, a first controller 35 and a display device 40. For example, the display device 40 is likely to fulfil the role of first imager 30 and/or of first controller 35.

The first imager 30 is configured to acquire at least one first image 45 of each device 10A, 10B, for example, in order to acquire a plurality of successive images 45 of each device 10A, 10B.

The first imager 30 is also configured to transmit the one or more first images 45 to the controller 35, either directly by a wired or wireless data link, or by means of an information medium such as a hard disc, a floppy disc, or even a ROM or RAM, such as an SD card or a USB stick.

The first imager 30 is integrated, for example, in a photographic appliance, a camera, or even a mobile telephone or an electronic tablet.

The first imager 30 is, for example, a matrix sensor, such as a CCD ("Charge-Coupled Device") sensor or a CMOS ("Complementary Metal-Oxide Semiconductor") sensor.

The first controller 35 is configured to implement a method for managing the display of at least one information item relating to at least one device 10A, 10B.

The first controller 35 is a data processing unit capable of handling and modifying data in the form of electrical signals. The terms "controller" and "information processing unit" will be considered to be synonyms in this description.

The first controller 35 comprises a first processor 50 and a first memory 55.

The first memory 100 contains a first computer program product 60.

The first computer program product 60 contains software instructions configured to cause the aforementioned method to be implemented when the software instructions are executed on the first processor 50.

The first computer program product 60 has, for example, been previously copied into the first memory 55 from an information-readable medium 65.

An information-readable medium 65 is a medium that can be read by the device 10, normally by the first controller 35. The information-readable medium 65 is a medium adapted to store electronic instructions and capable of being coupled to a bus of a computer device.

By way of an example, the information-readable medium 65 is an optical disc, a CD-ROM, a magneto-optical disc, a ROM, a RAM, an EPROM, an EEPROM, a magnetic card or an optical card.

The first program 60 comprising program instructions is stored on the information-readable medium 65.

Figure 3:
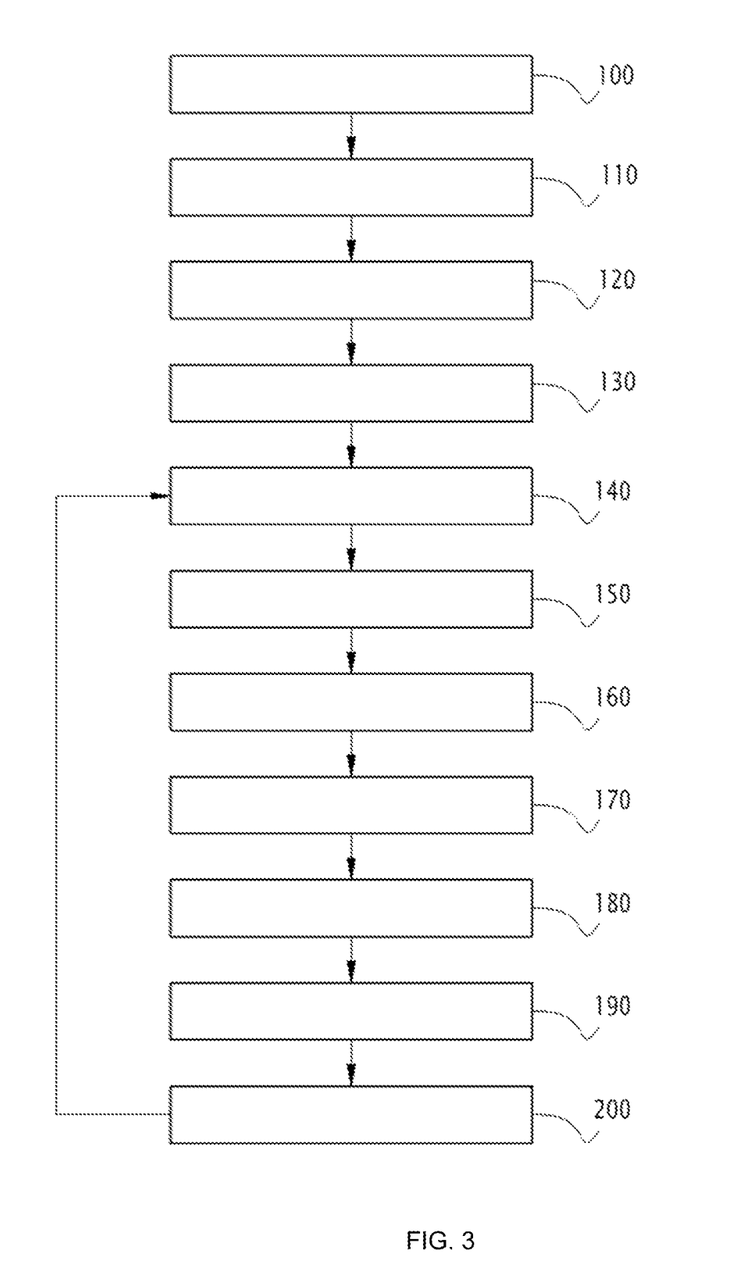
FIG. 3 is a flow chart of the steps of a display management method implemented by the system of FIG. 2.

According to an alternative embodiment, the first controller 35 is formed by one or more dedicated integrated circuits, or even by a set of programmable logic components, whilst remaining configured to implement the display management method that will be described with reference to FIG. 3.

The display device 40 is, for example, a mobile device such as a tablet, a pair of smart glasses or even a mobile telephone.

The display device 40 comprises a second imager 70, a display screen 75 and a second controller 80.

The second imager 70 is configured to acquire images and transmit them to the second controller 80.

The second controller 80 is, for example, a controller separate from the first controller 35 and placed on board the display device 40. It should be noted that, according to an alternative embodiment that can be contemplated, the functions of the second controller 80 are carried out by the first controller 35, for example, via a remote data link between the first controller 35, the second imager 70 and the screen 75.

The second controller 80 is configured to implement the method for managing the display of at least one information item relating to at least one device 10A, 10B in association with the first controller 35.

The second controller 80 comprises a second processor 85 and a second memory 90.

The second memory 90 contains a second computer program product, which forms part of the first computer program product, for example.

The second computer program product contains software instructions configured to cause the aforementioned method to be implemented when the software instructions are executed on the second processor 85.

The second computer program product has, for example, been copied into the second memory 90 from an information-readable medium 65.

According to an alternative embodiment, the second controller 80 is formed by one or more dedicated integrated circuits, or even by a set of programmable logic components, whilst remaining configured to implement the display management method that will be described with reference to FIG. 3.

An example of a method for managing the display of at least one information item, implemented by the system 25, will now be described with reference to FIG. 3, which shows a flow chart of the steps of this method.

The display management method comprises a first supply step 100, a first generation step 110, a first superimposition step 120, a first positioning step 130, a second supply step 140, a detection step 150, a second generation step 160, a display step 170, and optionally a third supply step 180, a second superimposition step 190 and a second positioning step 200.

During the first supply step 100, at least one first image 45 of at least one device 10A, 10B is provided, for example, a plurality of first images 45.

For example, a single image of the location containing several first images 45 of various parts of each device 10A, 10B is supplied, or several first images 45 are acquired separately.

Each first image 45 is, for example, a first image 45 of a face 12 of a device 10A, 10B, on which the various units 20A to 20M supported by this face are visible.

Each first image 45 is acquired, for example, by an operator using the first imager 30 and is transmitted to the first controller 35.

It should be noted that the one or more first images are capable of being acquired and supplied to the first controller 35 in numerous distinct ways, for example, of being automatically acquired by the first imager 30 placed on a rotary support controlled by the first controller 35.

Each first image 45 is, for example, an image that is acquired by placing the first imager 30 opposite the device 10A, 10B, so that the optical axis of the first imager 30 is perpendicular to a direction X, Y or Z, in particular to the direction X.

Figure 4:
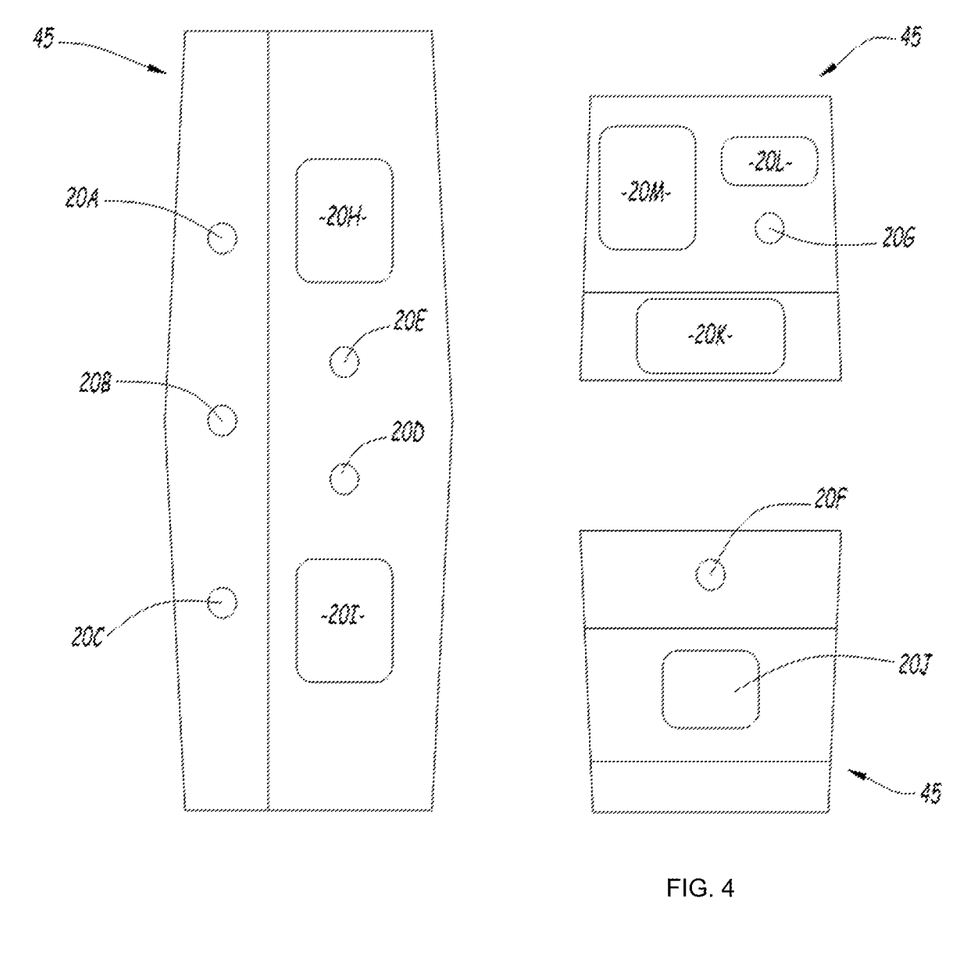
FIG. 4 is a view of a set of images of the devices of FIG. 1.

Three first images 45 of the devices 10A, 10B are shown in FIG. 4. For ease of identification, the various units 20A to 20M appearing on the first images 45 have been identified by the corresponding reference signs.

Each first image 45 is obtained, for example, by acquiring, using the first imager 30, an image of the location and by removing, from the image, the parts of the image not representing the device 10A, 10B or the part of the device 10A, 10B intended to be shown.

As shown in FIG. 4, the first images 45 of the devices 10A, 10B are slightly distorted by perspective effects, which tend to refine some ends relative to others or at the centre of the images.

During the first generation step 110, a representation of the location is generated by the controller 30 in the memory 55.

The representation comprises a template 210 of at least one device 10A, 10B, for example, a template 210 of each device 10A, 10B.

A "template" is understood to be a simplified model of a device 10A, 10B particularly complying with at least some of the dimensions of the considered device 10A, 10B.

In particular, at least one maximum height (in the vertical direction Z) and a maximum width (in the direction Y) of the device 10A, 10B are respectively equal to the maximum height and width of the template 215 of this device 10A, 10B.

For example, the operator measures the dimensions of each device 10A, 10B and transmits the dimensions to the controller 30 for the generation of the template 210.

As an alternative embodiment, the dimensions of the devices 10A, 10B are measured by the first imager 30, or are even computed by the controller 30 on the basis of the first images 45.

Each template 210 comprises at least one parallelepiped 215A, 215B, 215C. It should be noted that the number of parallelepipeds used is likely to vary.

In particular, the template 210 is made up of a parallelepiped 215A, 215B, 215C or of a plurality of parallelepipeds 215A, 215B, 215C.

When the template 210 comprises a plurality of parallelepipeds 215A, 215B, 215C, at least two of the parallelepipeds 215A, 215B, 215C are, for example, in contact at two of their respective faces.

During the first generation step 110, each template 210 is, for example, generated on the command of an operator, who commands the generation of each parallelepiped 215A, 215B, 215C by entering its dimensions into the controller 30, for example, via a human-machine interface of the controller 35, and by modifying the relative positioning of the various parallelepipeds 215A, 215B, 215C in order to form the template 210 of each device 10A, 10B.

For example, the first controller 35 comprises a generation module, formed, for example, by executing some of the software instructions of the computer program product 60 and capable of generating and of positioning each parallelepiped 215A, 215B, 215C in the representation of the location as a function of the commands of the operator. For example, the generation module proposes, via the human-machine interface of the first controller 35, that the operator generates a parallelepiped 215A, 215B, 215C, defines its dimensions and positions it in the representation of the location, then, when this parallelepiped 215A, 215B, 215C has been defined, dimensioned and positioned, repeats these operations with a new parallelepiped 215A, 215B, 215C.

Each parallelepiped 215A, 215B, 215C has six faces defining the parallelepiped 215A, 215B, 215C.

Figure 5:
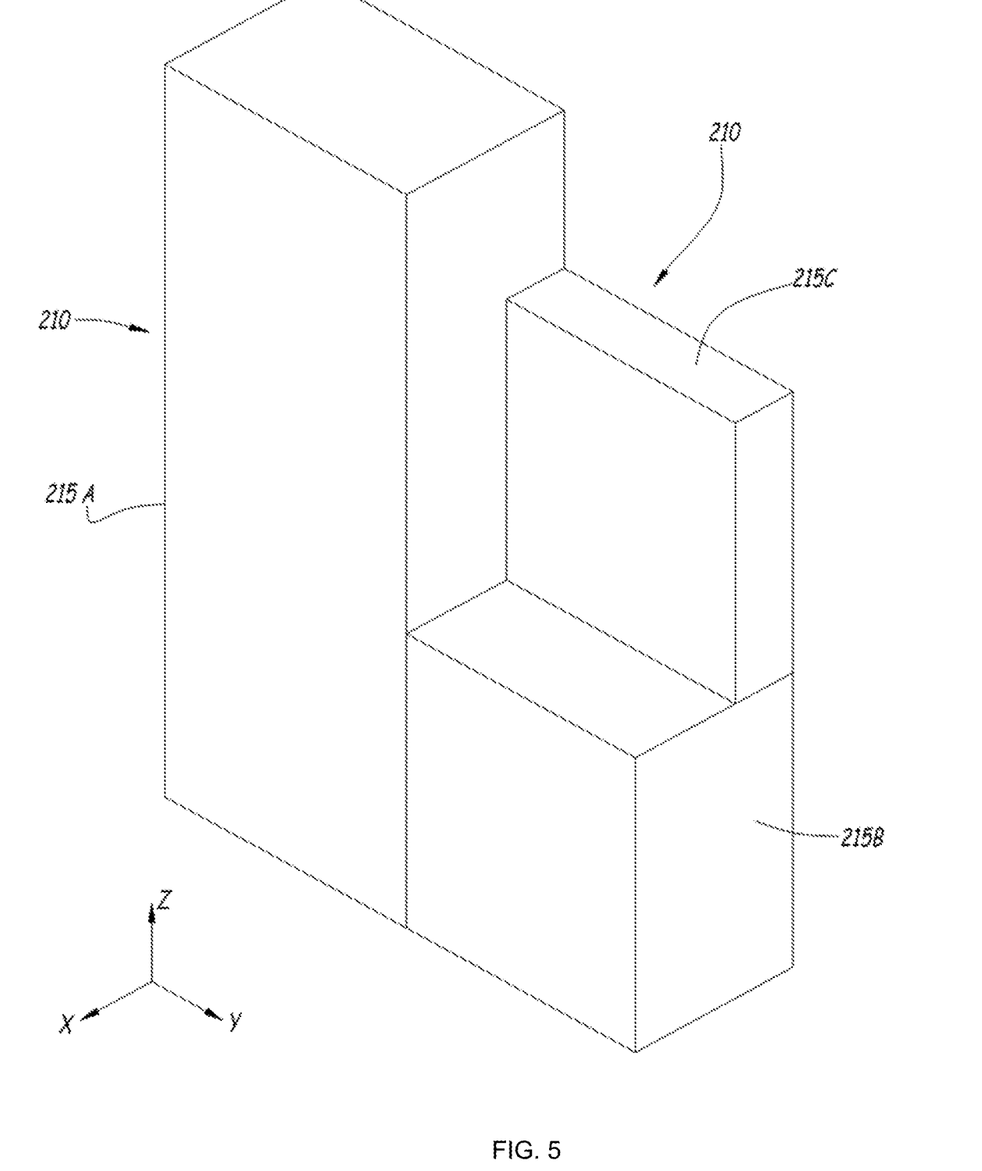
FIG. 5 is a view of templates of the devices of FIG. 1, generated by the system of FIG. 2.

Two templates 210 are shown in FIG. 5. A template 210 of the device 10A comprises a single parallelepiped 215A and the other template, which is a template 210 of the device 10B, comprises two parallelepipeds 215B and 215C superimposed in the vertical direction Z.

For example, each parallelepiped 215A, 215B, 215C corresponds to a respective casing 15A, 15B, 15C, and the parallelepipeds 215A to 215C are disposed relative to each other in a similar manner to the casings 15A, 15B, 15C.

It should be noted that, in one embodiment, several parallelepipeds can correspond to a single casing 15A, 15B, 15C, for example, if the shape of this casing is complex. For example, the casing 15A, comprising a projecting part on the face 12 defining it in the direction X, as shown in FIG. 1, should be able to correspond to a template 215A formed by two parallelepipeds, with the parallelepipeds 215A and another parallelepiped representing the projection.

As an alternative embodiment, a single parallelepiped 215A, 215B, 215C can correspond to a plurality of separate casings 15A, 15B, 15C, if the parallelepiped on its own can acceptably represent all these casings.

For example, a single parallelepiped is likely to form a template for a set of several devices 10A, 10B.

In general, the operator selects the number, the size and the respective positioning of the one or more parallelepipeds 215A to 215C in order to obtain a template 210, the dimensions of which correspond to those of the corresponding device 10A, 10B and the shape of which is close enough to that of the device 10A, 10B to allow acceptable positioning of points of interest 225, as will be described hereafter.

The parallelepiped 215B forms a template of the casing 15B, and the parallelepiped 215C forms a template of the casing 15C.

The width and the height of the parallelepiped 215A is, for example, identical to the width and the height of the device 10A, in particular of the casing 15A.

The depth of the parallelepiped 215A is, for example, equal to the minimum depth of the device 10A, even though the depth of each parallelepiped 215A, 215B, 215C is likely to vary. "Minimum depth" is understood to be the smallest external dimension of the device 10A in the direction X. According to an alternative embodiment, the depth of the parallelepiped 215A is the maximum depth of the device 10A, i.e. the largest external dimension in the direction X, still ranging between the minimum and maximum depths of the device 10A.

The parallelepiped 215B corresponds to the casing 15B and has the same width and the same depth as the casing 15B.

The parallelepiped 215C corresponds to the casing 15C and has the same width and the same depth as the casing 15C. The depth of the parallelepiped 215C is equal, for example, to the minimum depth of the casing 15C.

Each parallelepiped 215A, 215B, 215C is disposed so that each of its faces is perpendicular to one of the directions X, Y and Z.

Thus, each parallelepiped 215A to 215C has a face perpendicular to the direction X and corresponding to a face 12 supporting one or more of the units 20A to 20M of the device 10A, 10B corresponding to the considered parallelepiped.

In general, each face of each parallelepiped 215A, 215B, 215C defines the parallelepiped in one of the directions X, Y and Z and corresponds to one or more faces 12 defining, in the same direction X, Y or Z, the device 10A, 10B with which the parallelepiped is associated. Each face of each parallelepiped 215A, 215B, 215C then represents, in the template 210 of a device 10A, 10B, one or more faces 12 defining, in the same direction X, Y or Z, the device 10A, 10B.

The representation of the location further comprises spatial information relating to the positioning of the various templates 210 in the space relative to each other, so as to allow the representation to be superimposed on an image of the location. These information items are, for example, absolute positioning information items, allowing each point of each template 210 to be positioned relative to one or more of the reference points of the location.

During the first superimposition step 120, at least one first image 45 of a device 10A, 10B is superimposed on a face of the template 210 of the device 10A, 10B. For example, a first respective image 45 is superimposed, in the representation, on each face of the templates 210 corresponding to a face 12 supporting a unit 20A to 20M of the device 10A and 10B.

Figure 6:
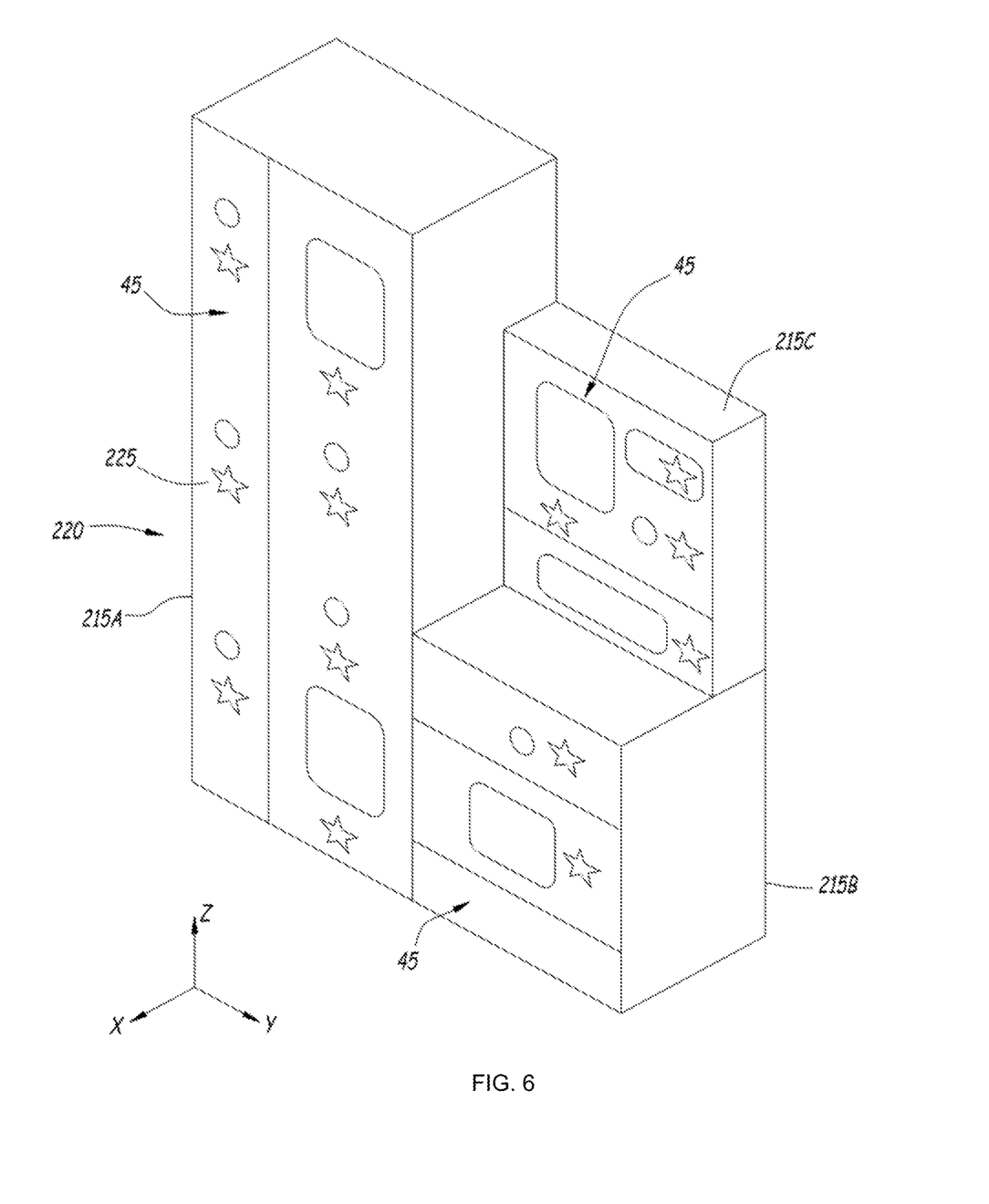
FIG. 6 is a view of representations of the devices of FIG. 1, generated by the system of FIG. 2.

On completion of the first superimposition step 120, a representation 220 is obtained of the one or more devices 10A, 10B, shown in FIG. 6. The representation 220 is formed by parallelepipeds 215A, 215B, 215C and by first images 45 superimposed on at least some of the faces of the parallelepipeds 215A, 215B, 215C.

The representation of the location particularly contains the representations 220 of each device 10A, 10B that have been generated.

According to one embodiment, the first superimposition step 120 comprises rectification of at least one first image 45 before the superimposition. "Rectification" is understood to be a modification of the first image 45 allowing the perspective effects to be corrected. A rectification completes, for example, a homology between the first acquired image 45 and the first rectified image 45.

Each first image 45 is particularly rectified so as to coincide the corners of each first image 45 with the corners of the face of the parallelepiped 215A, 215B, 215C with which it is superimposed.

The rectification is carried out, for example, on the command of the operator, or even automatically by the controller 35.

The first superimposition step 120 is implemented, for example, on the command of the operator by a superimposition module of the controller 35, for example, formed by some of the software instructions of the program 60, with this module proposing that the operator selects a face of a parallelepiped 215A, 215B, 215C and a first image 45, and superimposing the selected image 45 on the selected face by rectifying it if necessary.

It should be noted that, during the first superimposition step 120, one or more of the faces of the templates 210 are likely to be left blank, i.e. not have a first corresponding image 45 superimposed thereon, and only one or a plurality of faces of the templates 210 will each be superimposed on a first corresponding image 45.

During the first positioning step 130, the first controller 35 positions at least one point of interest 225 in the representation 220.

The various points of interest 225 are shown in FIG. 6 using stars.

Each point of interest 225 is a graphical indication in the representation 220, associated with an element or with a location of a device 10A, 10B for which information exists.

Each point of interest 225 is associated, for example, with a unit 20A to 20M of the considered device 10A, 10B.

Each point of interest 225 comprises the one or more information items associated with the corresponding element.

Each point of interest 225 is configured, when the representation 220 is displayed on a screen, to allow an operator to access the information item or the associated information items.

For example, each information item is, for example, a digital data item, such as a text value, a measurement value, an image, a graphical widget (a graphical interface component, a visual element of a graphical interface, or a button, a scrollbar, a drop down list or other), a hypertext link, a representation of an electrical, hydraulic or pneumatic circuit, or any type of document, video or other, or any relevant data for displaying in augmented reality. For example, at least one information item is an indication of a type of device powered by an electrical outlet associated with the point of interest 225, or even an information item allowing the link to be made with the part of the electrical diagram describing the device 10A, 10B.

For example, the operator commands, via the human-machine interface, the positioning of each point of interest 225 in the representation 220.

To this end, a positioning module of the first controller 35 proposes, for example, that the operator generates a point of interest 225 and positions the point of interest 225 in the representation 220 as a function of the commands of the operator.

In particular, each point of interest 225 is positioned on a first image 45. For example, the point of interest 225 is positioned on the part of the first image 45 that shows the corresponding unit 20A to 20M, or in the vicinity of this part.

As an alternative embodiment, at least one point of interest 225 is not associated with a precise point, such as a unit 20A to 20M of the considered device 10A, 10B. In this case, the positioning of the point of interest 225 is likely to vary.

The positioning module also proposes that the operator enters the information into the human-machine interface and integrates the information in the point of interest 225, or selects the information from a predefined list of information.

As an alternative embodiment, each point of interest 225 is selected by the operator from a predefined list of points of interest 225 stored in the first memory 55.

According to another alternative embodiment, the positioning module is configured to recognize, on the images 45, units 20A to 20M associated with points of interest 225, and to position the one or more corresponding points of interest 225 in the vicinity of the units 20A to 20M on the first images 45 that have been superimposed on the faces of the templates 210.

As an optional addition, each first superimposed image 45 is hidden, by the generation module, after all the points of interest 225 have been positioned. For example, each first superimposed image 45 is made invisible or partially invisible or even completely transparent.

On completion of the first generation step, the representation 220, comprising the templates 210 and the points of interest 225, and optionally the first images 45 superimposed on the face of the templates 210, is transmitted to the second controller 80, which stores it in the first memory 90.

During the second supply step 140, the second controller 80 is supplied with at least one second image of the device 10A, 10B, for example, an image of the location containing the devices 10A, 10B.

For example, the second imager 70 acquires an image of the location or a plurality of successive images of the location, and transmits each image of the location to the second controller 80. All the images of the location acquired during the second supply step 140 form a video signal, for example.

During the detection step 150, a detection module, which forms part of the second controller 80 and is, for example, formed by software instructions executed on the second processor 85, detects, in at least one image of the location, for example, in each image of the location, a second image of a device 10A, 10B or of part of the device 10A, 10B.

For example, the detection module detects a position and an orientation of the second imager 70 in the space when the image of the location is acquired, and deduces therefrom that part of the image of the location is a second image of the device 10A, 10B.

For example, the detection module detects the position and the orientation using signals supplied by a satellite positioning system, or even by a specific positioning system in the considered location, or even a system such as a LIDAR. As an alternative embodiment, the location comprises tags or other recognizable elements on an image, each identifying a point of reference of the location, the detection module recognizes these tags and other elements on the image of the location and deduces therefrom the position and the orientation of the second image 70 in the space.

According to one embodiment, the detection module recognizes noteworthy points of the location and estimates their position by triangulation from a set of images of the location.

In a manner per se known, during the second generation step 160, the second controller 80 generates, for example, using a dedicated generation module, at least one image, called enriched image. For example, the second controller 80 generates an enriched image for each image of the location.

Figure 7:
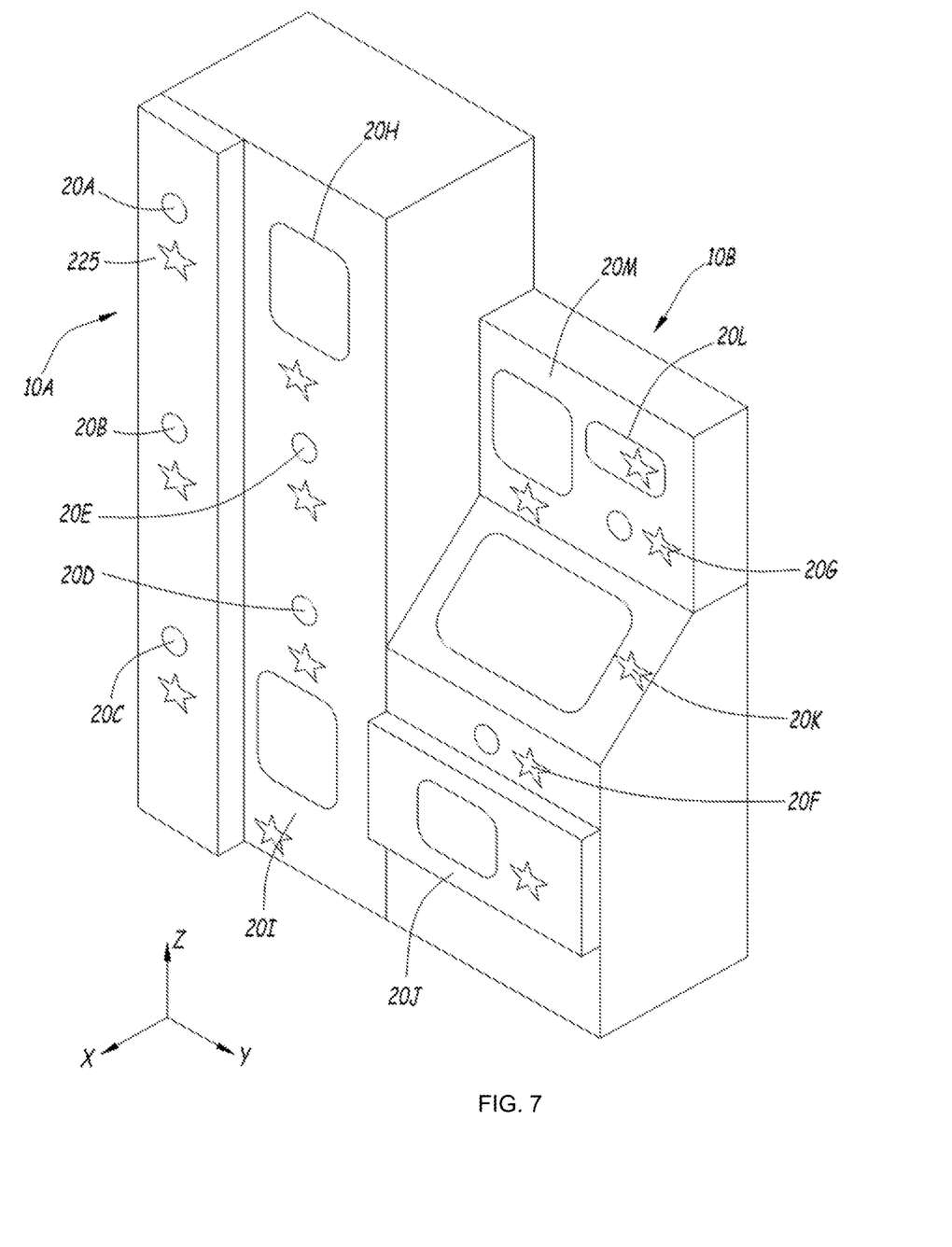
FIG. 7 is a view of an image of the devices of FIG. 1, on which at least one information item is displayed by the system of FIG. 2.

FIG. 7 shows an example of such an enriched image of the two devices 10A, 10B.

Each enriched image is generated on the basis of the representation 220 of the corresponding device 10A, 10B.

Each enriched image is obtained by superimposing, on each second image, the representation 220 of the corresponding device 10A, 10B. FIG. 7 particularly shows that the points of interest 225 are visible on the second images of the devices 10A, 10B.

According to one embodiment, the one or more first images 45 contained in the representation are made partially or completely transparent in the enriched image, so that the third image of the device 10A, 10B is not completely hidden in the enriched image.

It is clear that the superimposition of the representation 220 on the image of the device 10A, 10B is such that the points of interest 225 are disposed on or in the immediate vicinity of the parts of the second images that represent the elements or units 20A to 20M associated with the points of interest 225.

During the display step 170, each enriched image is displayed on the screen 75. Thus, the points of interest 225 are visible as a superimposition on each third displayed image.

Steps 180 to 200 are optionally implemented following a modification of at least one device 10A, 10B causing a modification of the representation 220 of this equipment 10A, 10B. For example, a unit 20A to 20M has been modified, deleted or added, and a point of interest 225 needs to be modified, deleted or added as a result.

During the third supply step 180, a third image of the device 10A, 10B is supplied, for example, by virtue of the first imager 30, in a similar manner to the first supply step 100.

During the second superimposition step 190, the third image is superimposed on a face of the template 210 of the corresponding device 10A, 10B, by replacing, if applicable, a possible first image 45 that would already be superimposed on this face, in a similar manner to the first superimposition step 120.

Finally, during the second positioning step 200, at least one point of interest 225 containing an information item relating to the modified device is positioned on the representation 220 after the second superimposition step 190.

By virtue of the use of templates 210 made up of one or of a plurality of parallelepipeds, the method only needs to manage a limited amount of data in the controllers 35 and 80. Indeed, parallelepipeds can be defined by limited information, which limits the size (in terms of the amount of information) of the representation 220 and makes it easy to manipulate.

Furthermore, each representation 220 is generated very quickly, since it simply involves acquiring a few images, measuring the dimensions of the device 10A, 10B, generating one or more parallelepipeds approximately reproducing the device 10A, 10B, superimposing the images on the corresponding faces of the parallelepipeds and visually positioning the points of interest on these images.

Superimposing at least one image 45 of the device on one or more faces of the parallelepipeds 215A to 215C allows precise positioning of the points of interest 225 in the space, since during this positioning the various units 20A to 20M can be seen by the operator.

Furthermore, most industrial devices 10A, 10B comprise numerous elements, the shapes of which are similar to parallelepipeds and which therefore can be simulated by parallelepipeds without losing too much precision with respect to the placement of the points of interest 225. When the shapes of the devices 10A, 10B are complex, the use of a plurality of parallelepipeds generally allows a template 210 to be generated with a shape that is close enough to that of the equipment to allow acceptable placement of the points of interest 225.

Furthermore, when the representation 220 needs to be modified following the modification of a device 10A, 10B, it is easy to precisely position the new image in the representation 220, since it simply needs to be superimposed on the corresponding face of the pre-existing template 210.

Rectification of the images 45 improves the superimposition of the image on the template 210 and therefore improves the precision for positioning the points of interest 225.

According to an alternative embodiment, the detection step 150 is not implemented. In this case, it is the operator, for example, who displays the representation 220 on the screen 75 in order to superimpose it on the second image of the corresponding device 10A, 10B by moving the second imager 70 in the space until the representation 220 and the third image are superimposed on each other, or even by moving and pivoting the representation 220 on the screen 75.

According to another alternative embodiment, only the edges of the templates 210 and the points of interest 225 are displayed to allow the operator to precisely superimpose the representation 220 on the second image.

As an optional addition, when the operator has superimposed the representation 220 on the second image, the operator notifies the controller 80 that the superimposition is complete. The controller 80 then stores the position of the representation 220 in the space and transmits positioning information of the representation 220 to the controller 35, which stores this information in the memory 55. Thus, the step of the operator positioning the representation 220 will not have to be repeated subsequently and will be replaced by the detection step 150.

The invention claimed is:

1. A method for managing a display, on a screen of an electronic system, of at least one information item relating to a device disposed in a location, the method comprising:
   supplying a data processing unit with at least one first image of the device;
   generating, by the data processing unit in a memory of the system, a representation of the location comprising at least one template of the device, the template being made up of a parallelepiped or of a plurality of parallelepipeds, each parallelepiped having six faces;
   superimposing the first image on a face of the template in order to form a representation of the device;
   positioning, on the representation of the device, at least one point of interest, each point of interest comprising at least one information item to be displayed relating to the device;
   supplying a controller with at least one second image of the device;
   generating, by the controller, an enriched image based on the representation of the device, wherein generating the enriched image comprises superimposing the representation of the device on the at least one second image of the device; and
   displaying the enriched image on the screen of the electronic system.

2. The method according to claim 1, wherein the superimposing the first image comprises rectifying the first image.

3. The method according to claim 1, further comprising:
   modifying the device, after the positioning of the at least one point of interest;
   supplying a third image of the modified device;
   replacing, in the representation of the device, the first image with the third image; and positioning, on the representation of the device, at least one point of interest comprising at least one information item to be displayed relating to the modified device.

4. The method according to claim 1, wherein the positioning of the at least one point of interest comprises positioning at least one point of interest on the first image superimposed on a face of the template.

5. The method according to claim 1, wherein, in the enriched image, the first superimposed image is completely or partially transparent during the displaying of the enriched image.

6. The method according to claim 1, wherein the supplying a data processing unit with at least one first image of the device comprises supplying a plurality of first images of the device, the template comprising a plurality of parallelepipeds in contact with each other, the superimposing the first image comprising superimposing a first respective image on each one of at least two faces of said parallelepipeds.

7. A non-transitory computer program product containing software instructions configured to implement the method according to claim 1 when the instructions are executed on a processor.

8. A non-transitory information medium, which stores software instructions configured to implement the method according to claim 1 when the instructions are executed on a processor.

9. A system for displaying information comprising an information processing unit, a memory, and at least one imager, the information processing unit being configured to:

receive at least one first image of the device from the at least one imager;

generate, in the memory, a representation of the location comprising at least one template of the device, the template being made up of a parallelepiped or of a plurality of parallelepipeds, each parallelepiped having six faces;

superimpose the first image on a face of the template in order to form a representation of the device; and position, on the representation of the device, at least one point of interest, each point of interest comprising at least one information item to be displayed relating to the device, and the system further comprising a display device comprising a display screen and a controller, wherein the information processing unit is configured to transmit the representation to the display device, the controller being configured to:

receive at least one second image of the device;

generate an enriched image based on the representation of the device, wherein generating the enriched image comprises superimposing the representation of the device on the at least one second image of the device; and command the enriched image to be displayed on the screen.

* * * * *